March 21, 1933.  C. G. OLSON  1,901,927

LOCK WASHER

Filed Sept. 10, 1930

Inventor:
Carl G. Olson
By Cheever, Cox & Moore
Atty's

Patented Mar. 21, 1933

1,901,927

UNITED STATES PATENT OFFICE

CARL G. OLSON, OF CHICAGO, ILLINOIS, ASSIGNOR TO SHAKEPROOF LOCK WASHER COMPANY, OF CHICAGO, ILLINOIS, A CORPORATION OF DELAWARE

LOCK WASHER

Application filed September 10, 1930. Serial No. 480,860.

My invention relates generally to lock washers, and more particularly to lock washers formed from flat spring stock.

One of the objects of my invention is to provide a plurality of teeth twisted out of the plane of a washer body portion which, when clamped against a work piece, will not be completely untwisted or flattened.

More specifically, my invention contemplates the provision of a washer having a plurality of teeth warped out of the plane of the body of the washer, the body portion of the washer being of greater thickness than the teeth and providing a load carrying area so as to enable said teeth to maintain locking contact with the work when said work has been clamped against the body portion of the washer. In other words, said load carrying body portion will prevent the teeth from being completely flattened when the load is applied to the washer, thereby enabling the teeth to maintain their diagonal relation with respect to the nut and the work piece.

A further object is to provide a washer as above set forth, in which the body portion includes a plurality of thicknesses of stock, whereby to present a body portion which is greater in thickness than the thickness of the washer teeth so as to prevent the complete untwisting of the teeth when clamped against a work piece.

Still more specifically, my invention contemplates the provision of a new and improved lock washer construction, which consists of a pair of interlocked washers, the interlocking of the washers serving to present a body portion of increased thickness which will accomplish the results above set forth.

The foregoing and numerous other objects and advantages will be more apparent from the following detailed description when considered in connection with the accompanying drawing, wherein—

Figure 1 discloses a double lock washer construction which is representative of one embodiment of my invention;

Figure 1:
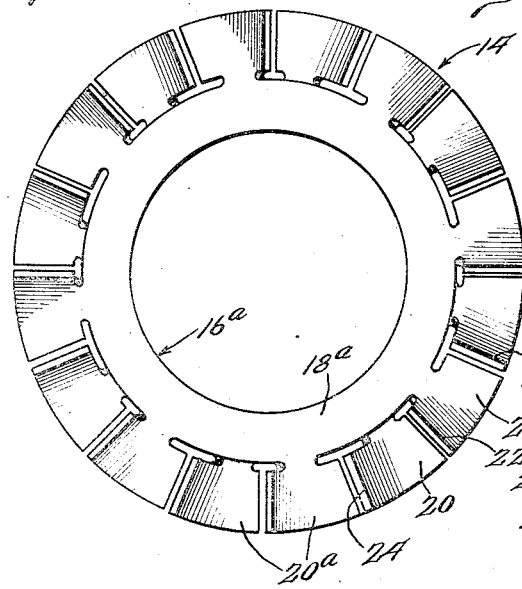

Referring now to the drawing more in detail, wherein like numerals have been employed to designate similar parts throughout the various figures, it should be noted that I have disclosed a number of modified washer constructions, and in each of these constructions I have disclosed lock washers having a body portion, which is greater in thickness than the thickness of the washer teeth.

Figure 2:
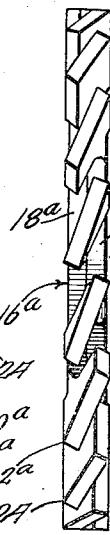
Figure 2 is an elevational view taken from the right of Figure 1.
Figure 3:
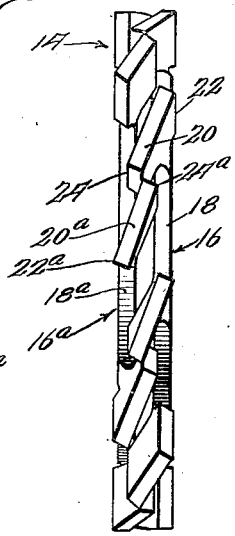
Figure 3 is a view similar to Figure 2, disclosing the lock washer sections spaced apart in order to more clearly disclose the structural arrangement thereof.

Referring particularly to Figures 1 to 3 inclusive, it will be observed that I have disclosed a lock washer construction which is designated generally by the numeral 14. This lock washer construction comprises a pair of similar lock washer sections 16 and 16a which are adapted to be juxta-positioned. The washer section 16 includes a body portion 18 and a plurality of work engaging teeth or prongs 20, which are twisted or flexed out of the plane of the washer body. By flexing or twisting the prongs 20 in the manner shown, work engaging edges or corners 22 and 24 are positioned out of the plane of the body 18.

The washer section 16a is similar to the section 16 and it includes a body portion 18a having a plurality of prongs 20a positioned along the outer margin thereof. These prongs are warped or flexed out of the plane of the body 18a so as to present work engaging teeth or corners 22a and 24a. It will be noted that the prongs 20 of the washer section 16 are spaced along the body portion 18 a sufficient distance to permit the prongs 20a of the washer section 16a to be positioned within these spaces when the two sections are brought together, as clearly shown in Figures 2 and 3. Thus, it will be apparent that the prongs on one washer section are adapted to be positioned within the spaces provided between the prongs on the other washer section, and when the sections are juxta-positioned, as shown in Figures 1 and 2, the annular flat surface of the body portion 18 abuts the complementary annular surface of the body portion 18a.

It should be noted that in the particular structural embodiment shown in Figures 1 to 3 inclusive, the prongs 20 and 20a are T-shaped, and that one side of the prongs, namely, the side of the prongs which carry the corners 24 and 24a respectively, are slightly longer than the sections of the prongs which carry the corners 22 and 22a. This construction is employed in order to enable the work engaging corners 24 and 24a to not only project beyond the plane of the body portion of their washer section, but also to project beyond the plane of the body portion of the companion section. In other words, this prong construction enables the corners 24 of the washer section 16 to not only project beyond the plane of the body portion 18, but also beyond the plane of the body portion 18a when the sections are juxta-positioned, as shown in Figure 2. Likewise, the corners 24a of the section 16a are adapted to project beyond the plane of the body portion 18. Obviously my invention is not limited to the particular prong construction shown in the drawing, but contemplates any form of warped, flexed, or twisted type of prong construction, which will enable the presentation of an annular body portion which is greater in thickness than the thickness of the prongs. It will be seen that the washer construction 14, shown in Figures 1 to 3 inclusive, includes two similar washer sections 16 and 16a, and each of the body portions 18 and 18a of said washer sections cooperate to present a washer body which is at least twice the thickness of the stock from which each of the washer sections is made. Thus it will be apparent that when a washer, such as the washer construction 14 is positioned adjacent a work piece, and a nut is clamped thereagainst, the projecting corners of the prongs will dig into the work, and if the nut is clamped with sufficient force so as to transmit the clamping load to the body portion comprising the body portions 18 and 18a, the prongs will not be completly flattened. In other words, the strutting action of the teeth will still be effective because said teeth will not be completely flattened.

From the foregoing it will be apparent that my invention contemplates the provision of an improved lock washer construction, in which a continuous annular washer section provides a body portion, which is greater in thickness than the thickness of the washer tooth extending therefrom. My improved washer may be made by stamping or otherwise forming the material from flat spring stock, and this may be accomplished by practicing conventional stamping methods. By providing a continuous body portion, the strength of the washer is greater than the strength of washers formed from strip material and the like. By employing a body portion of increased thickness, I am able to greatly increase the locking effectiveness of the washer teeth.

Obviously the body portions of the washer sections shown in the drawing may be secured together in any suitable manner, such as by spot-welding and the like, in order to positively prevent relative movement between said sections.

Obviously various forms of prong constructions, as well as annular body structures, may be employed which differ from those disclosed in the drawing, without departing from the spirit and scope of my invention, and said invention should be limited only by the scope of the appended claims.

Having thus described my invention, what I claim as new and desire to secure by Letters Patent is:

1. A lock washer construction including a pair of juxta-positioned lock washer sections, each of said sections including an annular body portion and a plurality of work engaging prongs spaced along and extending from one margin thereof, the prongs of one washer section adapted to be positioned within the spaces between the prongs of the other section, said prongs being warped out of the bounding planes of their respective body portions so as to present work engaging teeth on opposite sides of the combined lock washer sections.

2. A lock washer construction including a pair of washer sections adapted to be juxta-positioned, each of said sections including an annular body portion and a plurality of work engaging prongs spaced along a margin thereof, the prongs of one washer section adapted to be positioned within the spaces presented between the prongs of the other washer section, said prongs being warped out of the bounding planes of their respective body portions, each prong being warped a greater distance on one side of its companion body portion than the other side, whereby to present work engaging edges on opposite sides of the combined thicknesses of the annular body portions.

3. A lock washer construction including a pair of juxta-positioned lock washer sections, each of said sections including an annular body portion and a plurality of work engaging T-shaped prongs spaced along and extending from one margin thereof, the T-shaped prongs of one washer section adapted to be positioned within the spaces between the T-shaped prongs of the other section, said T-shaped prongs being warped out of the bounding planes of their respective body portion so as to present work engaging teeth on opposite sides of the combined lock washer sections.

4. A lock washer construction including a pair of juxtapositioned lock washer sections each of said sections including an annular body portion and a plurality of prongs spaced along and extending from at least one margin thereof, said prongs having work engaging teeth, the teeth of the prongs in each washer section being adapted to extend through the spaces between the prongs of the other section, whereby work engaging teeth will be positioned out of the bounding planes of the combined annular body portions of the washer sections.

In witness whereof, I have hereunto subscribed my name.

CARL G. OLSON.